US007790284B2

(12) United States Patent
Davies

(10) Patent No.: US 7,790,284 B2
(45) Date of Patent: Sep. 7, 2010

(54) FLEXIBLE COMPOSITE PREPREG MATERIALS

(76) Inventor: Robert M. Davies, 75 Woodcutter La., Palm Harbor, FL (US) 34683

( * ) Notice: Subject to any disclaimer, the term of this patent is extended or adjusted under 35 U.S.C. 154(b) by 0 days.

(21) Appl. No.: 12/236,626

(22) Filed: Sep. 24, 2008

(65) Prior Publication Data

US 2010/0075144 A1  Mar. 25, 2010

(51) Int. Cl.
*D02G 3/00* (2006.01)
(52) U.S. Cl. .................. 428/375; 428/902; 442/172
(58) Field of Classification Search ............. 428/375, 428/364, 396, 902
See application file for complete search history.

(56) References Cited

U.S. PATENT DOCUMENTS

| 5,094,883 A | 3/1992 | Muzzy et al. |
| 5,756,206 A | 5/1998 | Davies et al. |

*Primary Examiner*—Lynda Salvatore
(74) *Attorney, Agent, or Firm*—Dennis G. LaPointe

(57) ABSTRACT

A flexible, low-bulk pre-impregnated (pre-preg) towpreg, which is the resultant impregnation of a low pressure impregnation of a bundle of un-spread fiber tows arranged in a predetermined cross-sectional shape. During the low pressure impregnation process, the resin does not enter into the fiber bundle, but rather only coats the surface fibers comprising the tow, resulting in un-coated fibers in the core of the prepreg and with molten resin, partially adhering onto and around the exterior fibers of the fiber bundle such that the interior fibers remain uncoated and a thin, irregular sheath of resin is created on and around the exterior of the fiber bundle surrounding the core of dry fibers.

8 Claims, 2 Drawing Sheets

FLEXIBLE COMPOSITE PREPREG MATERIALS

FIELD OF THE INVENTION

The present invention relates to prepregs and, more particularly, to prepregs having low bulk and low bending rigidity, which utilizes low pressure impregnation or a similar coating process that involves the conversion of high-performance fiber bundles known as tows in the industry into a pre-selected cross-sectional form, such as flat ribbon form, coating only the outer fibers of the tow form with resin while leaving the interior fibers of the tow form uncoated, partially fusing the resin onto the tow to create an irregularly bonded sheath of resin about the tow, and winding the resulting flexible low bulk prepreg onto take-up bobbins for further processing into other useful, typically stiffer and lighter, components.

BACKGROUND OF THE INVENTION

Prepregs comprising fibers combined with a matrix resin are one form of prepreg. Conventional prepreg consists of hundreds or thousands of fibers embedded in a continuous mass of matrix. Reinforcing fibers can be glass fiber, carbon fiber, or many other types. The reinforcing fibers typically used are available commercially in continuous form in bundles known as tows, which vary widely in number of fibers per tow. Many matrix resins are available; however two kinds of matrix resin systems dominate the prior art: thermoplastic and partially cured thermoset polymers.

Thermoplastic polymers have advantages over thermosetting materials in fracture toughness, impact strength and environmental resistance. Thermoplastics also provide prepregs with indefinite shelf life, give the fabricator better quality assurance and avoid the storage and refrigeration problems associated with thermosetting prepreg. The disadvantage of thermoplastic polymers as a matrix material is the difficulty of uniformly coating the fibers due to the high viscosity of the molten polymer. Thermoplastic prepregs also typically are rigid and less well-suited for weaving or braiding and the resulting fabrics are stiff. Similarly, the rigidity of thermoplastic impregnated prepregs complicates the formation of complex shapes; heat must be focused at the point of contact to achieve conformability during layup.

Prepregs containing thermosetting pre-polymers, although relatively flexible, may be tacky, thus requiring a protective release coating, typically a release paper or film, which must be removed prior to use. While thermoset prepregs are acceptable for many applications, their tackiness and the requirement of a protective release coating have made thermoset prepregs unfeasible for weaving and braiding.

Continuous fiber prepregs can be produced by a number of impregnation methods including hot melt, solution, emulsion, slurry, surface polymerization, fiber comingling, film interleaving, electroplating, and dry powder techniques.

In hot melt processing, impregnation can be accomplished by forcing the fiber and resin through a die at high temperature under conditions that create high shear rates. This process completely encapsulates substantially all the fibers making the prepreg very stiff and brittle. Other disadvantages of this process include the high stress applied to the fibers and difficulties in impregnating the fiber tows with thermoplastics, leading to low processing speeds.

In solution coating, the matrix material is dissolved in solvent and the fiber is passed through this solution and then dried to evaporate the solvent. Two disadvantages of this process are that thermoplastics usually exhibit limited solubility at high concentration, and most engineering thermoplastics cannot be dissolved in a low boiling solvent at room temperature. Additionally, high solution viscosity results in the same impregnation problems as with hot melt, as well as causing the fibers to stick together. Another problem is the difficulty in removing the solvent. Further, traces of solvent left in the prepreg lead to undesirable porosity in the composite structures.

An emulsion process is one way to apply particulate polymer matrix material with a very small particle size to prepreg fiber by synthesizing the resin as an aqueous emulsion with a surfactant. The problem with this process is that the removal of the surfactant from the final prepreg is difficult.

Slurry coating or wet powder processing is a non-solvent coating technique designed to resolve the problem of the insolubility of most thermoplastics in a solvent at room temperature. In slurry coating, the powder is suspended in a liquid medium, wherein no solvency exists between the resin and the medium, and the fibers are drawn through the slurry. The slurried particulate matrix does not substantially wetout the fiber, resulting in the need for higher pressures to consolidate the matrix and fibers into a prepreg. This prepreg can be tacky, which is not suitable for weaving or braiding. Other disadvantages include the necessity for the removal of the liquid medium, volatiles, and dispersants or surfactants which are used to form the polymer/liquid colloidal state, the likelihood of aggregates in the slurry caused by poor mixing, and the possibility that polymer particles will settle during processing.

To achieve intimate mixing in emulsion or slurry coating, the particulate size of the slurry or emulsion should be smaller than the fiber diameter. For many of the thermoplastics that cannot be made by emulsion or dispersion polymerization, it is extremely difficult to produce such fine powder. Thus, a coarse blend between fibers and particles is obtained. The quality of the blend decreases as the particle size increases, leading to poor matrix distribution in the consolidated prepreg, and a poor composite structure.

In fiber comingling, the polymeric matrix is introduced in fibrous form. Polymeric and reinforcing fibers are mingled as dry blends. Effective impregnation depends on the degree of randomness of the intermingling of the resin and fiber throughout the system. Since no wetting of the reinforcing fibers by the matrix material occurs, higher pressures are needed to consolidate the prepreg under equivalent processing times and temperatures, as compared to completely wetted prepregs. Another disadvantage of comingling products is its higher bulk factor making it more difficult to fit in complex molds.

Film casting is one method for producing prepreg which resolves some of the problems associated with hot melt impregnation of thermoplastics. It consists of stacking a film layer of matrix material cast from either hot melt, or solution over the prepreg fibers. The fibers sandwiched between two films are heated and calendared to force the resin into the fibers. The resulting prepreg is a rigid sheet that is difficult to form into complex shapes without elaborate thermoforming techniques.

Powder coating of fibers coats the tows with a powdered resin using a dry electrostatic process and fusing the resin to the tow with high powered infrared ovens The powdered resin must be solid at ambient and elevated storage temperatures, and be capable of melting to permit flow and to penetrate the fiber tow when heated. Dry powder coating has a disadvantage of precise metered resin control. Another disadvantage of powder coating is shedding of resin from the tow before the high temperature fusing, making a poor quality prepreg. Another disadvantage is the resin must be ground into powder of specific size for optimum coating. The grinding process is expensive and makes this process more expensive.

Intermediate composite products, such as prepreg, must contain sufficient matrix, typically over 15% by volume, to permit consolidation of the components into a substantially void-free prepreg structure without requiring the incorporation of more matrix material. Linear prepregs can be converted into two and three dimensional product forms by weaving, braiding, filament winding, and other known processes. Alternatively, these prepregs can be used to create a discontinuous fiber reinforced feedstock for molding by chopping, cutting, or like known processes.

Prepreg can be converted to a preform of a predetermined shape and fiber orientation. Preforms can be produced by any one of the conventional textile preform making methods, such as weaving, braiding and knitting, or by processes such as filament winding and tape placement. Preforms ultimately or concurrently can be consolidated into composite parts by applying heat and pressure.

A powder coating process, such as the one disclosed in U.S. Pat. No. 5,756,206 to Davies et al. typically involves the following four steps;

Forming un-spread tow in various cross sections;

Coating un-spread tow with resin particles;

Partially melting the particles onto the surface of the un-spread tow; and

Taking up resulting towpreg onto bobbins.

During the melting process the resin particles which are placed on the surface of a fiber bundle, melt in discontinuous patches along the fibers, the only penetration of the fiber bundles is by capillary action and is minimal. The discontinuous patches portions of the underlying fiber to be exposed. This feature provides the reduced rigidity but exposes the fiber to damaging textile processes. The lumpy surface also increases bulk which requires deeper cavities than molds with lower bulk. The deeper cavity molds have more mass and require more heat input to reach melting temperatures of the matrix resin. This slows the process and takes longer to make finished articles. The lumpy surface can catch on fiber guide in a weaving, braiding operation, or any operation using the towpreg that requires pulling the tow through alignment guides or adjacent fibers to place the tow. The catching action can damage the towpreg or strip the resin from the surface of the tow. The damaged tow and missing resin areas of the resulting preform would produce an inferior composite article.

Therefore, a need exists in the industry for a relatively low bulk and flexible prepreg which can be accomplished by utilizing low pressure impregnation techniques and the advantages thereof.

SUMMARY OF THE INVENTION

The present invention generally is a flexible composite prepreg material formed by the conversion of high performance fiber tows into a predetermined cross-sectional form by one of a plurality of different methods involving low pressure impregnation of the tow with molten resin, partially adhering onto and around the exterior fibers of the fiber bundle such that the interior fibers remain uncoated and a thin, irregular sheath of resin is created on and around the exterior of the fiber bundle. The resulting prepreg is wound onto take-up bobbins for further applications.

The resulting flexible prepreg then can be converted into preforms for composite applications through one of many conventional textile processes, or by tape laying or filament winding. The preforms are ultimately converted into composite parts by applying heat and pressure, consolidating the fiber and resin into a homogeneous item.

The resultant flexible prepreg is formed by coating un-spread fiber tows in various cross-sectional configurations with a matrix resin, wherein the tows are arranged in a predetermined cross-sectional shape, such as flat ribbon form, ellipses, rectangles and circles. The reshaping of the cross-section of the tow may be obtained by passing the tow through an aperture which is part of a low pressure impregnating apparatus. During the low pressure impregnating process, since the fibers are not spread, the resin melt does not penetrate deeply into the fiber bundle, but rather coat only a few fibers on the surface of the tows. This results in dry internal fibers in the core of the prepreg and an irregular sheath of substantially coated external fibers.

The external fibers are mostly coated on the surface of the prepreg; however, the resin coating is an irregular thickness yet more or less uniformly distributed along the entire surface of the fiber bundle, with the resulting thin cross-section having decreased bending rigidity. The combination of the irregularly coated surface fibers and dry core structure results in a prepreg with relatively low bulk and comparable bending rigidity in comparison to prepregs produced with the existing methods.

Accordingly, it is a primary object of the present invention to provide flexible prepregs with the least possible bulk using high performance fibers such as carbon, aramids, glass fibers, metal fibers, ceramic fibers, organic fibers, and the like, and resin materials including both thermoset and thermoplastic resins.

It is another object of the present invention to provide low-bulk, flexible prepregs having at least 15% resin by volume, thereby permitting consolidation of the components into a substantially void-free composite structures.

It is another object of the present invention to provide low-bulk, flexible prepregs wherein the resin is uniformly distributed across and along the exterior fibers of the tow, so that with application of pressure and temperature, the resin will be able to melt and flow between the fibers to result in a uniform degree of wetout of the fibers when forming a composite article.

It is yet another object of the present invention to provide low-bulk, flexible prepregs which allows for the maximum number of fibers to be covered with the resin material without increasing the bulk or rigidity of the prepreg.

It is yet another object of the present invention to provide low-bulk, flexible prepregs which proposes partial impregnation, as opposed to complete impregnation of the resin to achieve adhesion of the resin to the fibers.

Another object of the present invention is to provide a prepreg comprising a bundle of fibers, the interior fibers remaining free of matrix forming resin and the exterior fibers impregnated with resin partially adhering onto and around the fibers on the exterior of the bundle.

It is yet another object of the present invention to provide low-bulk, flexible prepregs which is suitable for processing various types of commercially available fibers and resin materials in a cost efficient manner.

It is yet another object of the present invention to provide low-bulk, flexible prepregs which is suitable for processing various types of resin with additives and fillers. Additives can provide for fire resistance, ultra violet light protection, or colors to name a few. Fillers can provide improved interlaminate shear properties, improved through the thickness thermal conductivity, or increased hardness to name a few.

These objects and other objects, features and advantages of the present invention will become apparent from the following discussion when read in conjunction with the attached drawings, in which like reference numerals correspond to like components throughout the several views.

BRIEF DESCRIPTION OF THE DRAWINGS

In the accompanying drawings.

DETAILED DESCRIPTION OF THE INVENTION

Reducing the bulk of the prepreg without sacrificing the flexibility and other properties of the prepreg is an important advantage of the present invention. This is accomplished by suitably modifying the fiber architecture of the tow before coating the fibers with resin material.

Thermoplastic resin is a preferable matrix resin because the impact strength of the molded products made from them are good and the molded products can be made by any molding process such as hot press molding. The preferred thermoplastic resin includes polyamide (PA); polyesters such as polyethylene terephthalate (PET), polybutylene terephthalate (PBT), polyphenylenesulfide (PPS), polytrimethylene terephthalate (PTT), polyetherketone (PEK), polyetheretherketone (PEEK), polyetherketoneketone (PEKK), polyarylate polyethylene (FE), polypropylene (PP), Acrylonitrile butadiene styrene (ABS); polyoxymethylene (POM), polycarbonate (PC), polymethylenemethacrylate (PMMA), polyvinyl chloride (PVC), polyphenylene ether (PPE); polyimide (PI), polyamideimide (PAI), polyetherimide (PEI), polysulfone (PSU), polyethersulfone; polyketone (PK), or any melt processable polymer can be used.

The present invention can also be accomplished using thermoset resin. The preferred thermoset include epoxy, phenolic's, polyimide's, and polyurethane.

Tows 12 can consist of glass fiber, carbon fiber, aramid fiber, high modulus polyethylene fiber, quartz fiber, ceramic fiber, boron fiber, basalt fiber, steel fiber, aluminum fiber, stainless steel fiber, flax fiber, hemp fiber, jute fiber, kenaf fiber, sisal, bamboo fiber, or any fiber material. The fibers 16 can be continuous fibers or discontinuous fibers such as stretch broken or spun fibers.

Figure 1A:
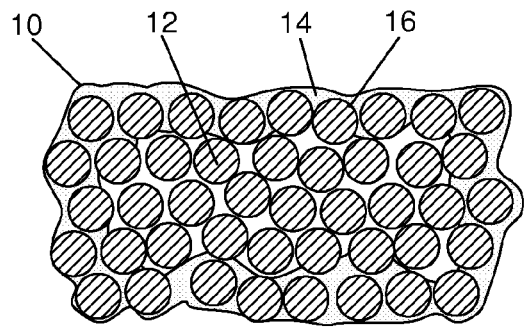
FIGS. 1A-1C are cross-sectional representative depictions or illustrations of examples of geometries for the tows used with the present invention.
Figure 1B:
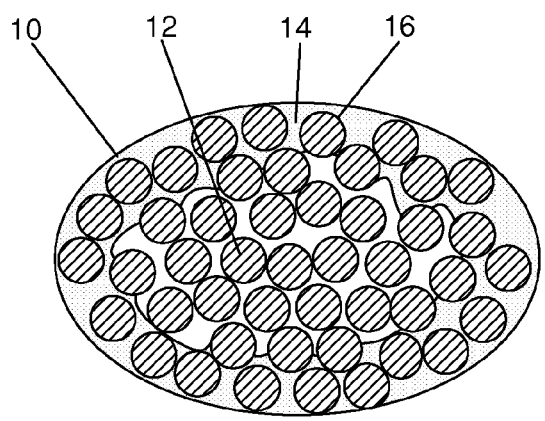
Figure 1C:
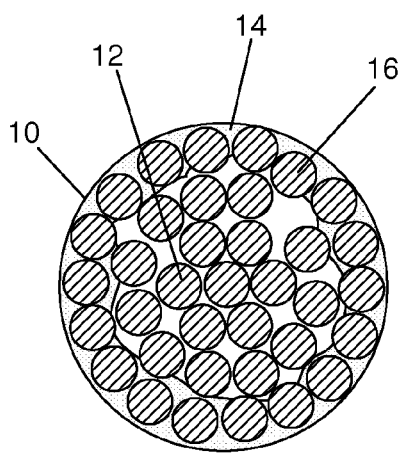

In accordance with the present invention, the spreading process used in conventional extrusion coating is eliminated. A uniform coating of resin on the fiber tow exterior is obtained by suitably modifying the tow architecture before coating the tows. Referring to FIGS. 1A-1C, the resultant tow or material of the present invention is generally designated as 10. Typically, when using the principles of the low pressure impregnation process at a pressure range of between 0.0 and 6.9 bar, preferably between 0.3 and 1.4 bar, the tow 12 from a supply package is unwound and pulled in a low pressure impregnation process apparatus where the molten resin 14 is thinly distributed onto the fibers 16 of the tow 12 at a low pressure. Once the tow 12 emerges the low pressure impregnation process apparatus, the tow 12 is then cooled by passing the tow 12 through a cooling system. A pulling system is typically used to pull the tow 12 through the process at a controlled rate before being wound onto a take-up package.

The fiber tow can be pulled from a conventional creel device 18 with little or no tension control. It is important that it unrolls freely so as not to effect the coating process or to cause damage to the fiber bundle. A tensioning device is typically employed close to the entrance of the coating device. Its purpose is to supply the tow to the die area in a uniform format and at a tension the packs the fibers closely before entering the resin melt zone.

Figure 2:
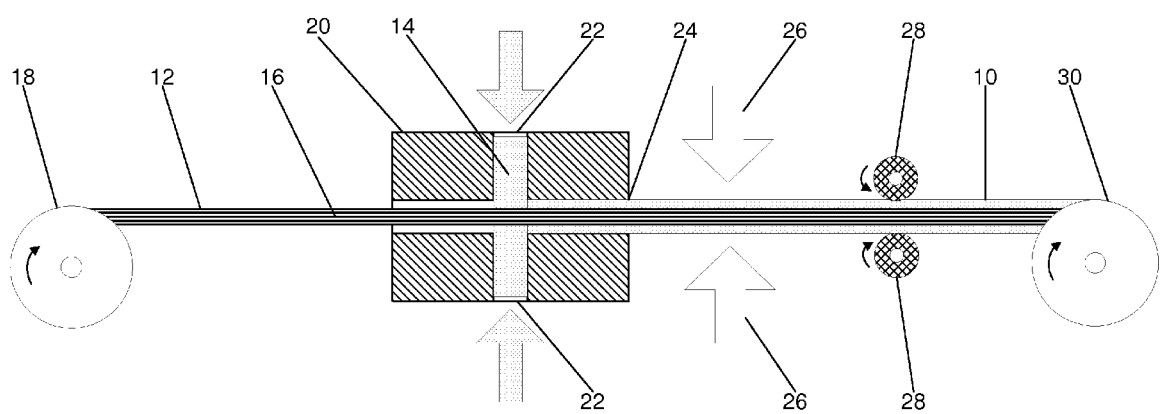
FIG. 2 is a representative example of flow chart depicting a process wherein a resin melt zone, which minimizes the resin exposure to the fiber is incorporated.

The resin melt zone, which minimizes the resin exposure to the fiber is incorporated in the production process of the tow 12. As depicted representationally in FIG. 2, this is accomplished by passing the fibers 16 between opposing apertures 22 in an impregnation apparatus 20 through which the molten resin 14 must flow at a low pressure before engaging the tow 12 as it passes by at the predetermined line speed. This reduced residence time combined with resin pressure between 0.0 and 6.9 bar and preferably between 0.3 and 1.4 bar, provides a means of applying precise partial impregnation the tow 12.

The exit wall of the melt zone is near perpendicular to the tow path so as not to drag additional resin through the final forming die section. The forming die 24 shapes the tow and provides shearing along the surface of the coated tow. This shearing action removes excess resin and promotes an irregular surface as the tow exits the die.

The tow can air cool at 26 after leaving the die or it can be cooled with many techniques. One may be forced air from a ducted fan. Another way is to use chilled rolls onto which the tow is placed.

The pulling system 28 can be a nip roll or a belt puller, both of which are common in the extrusion and coating fields. Typically the low pressure impregnation line is operated in the range of approximately 10 to 125 meters per minute.

The take up on a spool 30 is done by a conventional textile winding machine.

The qualities of the prepreg, such as bending rigidity, and the properties of laminates produced from these prepregs depend upon the cross-sectional shape of the tow and the resin content. Different possible geometries of the cross sections of the tow are provided in FIGS. 1A-1C, which respectively show a flat ribbon geometry, an elliptical geometry, and a circular geometry. These different shapes can be obtained by forming the tows through a die with the required cross-sectional shape.

Although the present invention has been described with reference to particular embodiments, it will be apparent to those skilled in the art that modifications to the method, materials, dimensions and conditions discussed above may be made which are in keeping with the spirit and scope of the present invention.

What is claimed is:

1. A flexible composite prepreg material comprising a fiber bundle of un-spread fiber tows having a predetermined cross-sectional shape, wherein exterior surface fibers of said fiber bundle have a uniformly distributed sheath of matrix resin on and around said exterior surface fibers of said fiber bundle, said matrix resin being placed in its melt phase on an exterior surface of said fiber bundle wherein said matrix resin is impregnated onto said exterior as well as through said exterior surface such that said matrix resin is partially adhered onto and circumferentially around said exterior surface fibers of said fiber bundle with resultant un-coated fibers in a core of said fiber bundle and resulting in a prepreg material with a lower bulk than another fiber bundle coated by a resin on a surface alone of an exterior surface of said another fiber bundle.

2. The material according to claim 1, wherein said fiber bundle is processed by a low pressure resin impregnation process wherein a matrix resin is thermally fused onto exterior surface fibers of said fiber bundle.

3. The material according to claim 1, wherein said matrix resin is a thermoplastic resin or a thermoset resin.

4. The material according to claim 3, wherein said thermoplastic resin is selected from the group consisting of polyamide (PA); polyesters such as polyethylene terephthalate (PET), polybutylene terephthalate (PBT), polyphenylenesulfide (PPS), polytrimethylene terephthalate (PTT), polyetherketone (PEK), polyetheretherketone (PEEK), polyetherketoneketone (PEKK), polyarylate polyethylene (PE), polypropylene (PP), Acrylonitrile butadiene styrene (ABS); polyoxymethylene (POM), polycarbonate (PC), polymethylenemethacrylate (PMMA), polyvinyl chloride (PVC), polyphenylene ether (PPE); polyimide (PI), polyamideimide (PAI), polyetherimide (PEI), polysulfone (PSU), polyethersulfone; and polyketone (PK).

5. The material according to claim 3, wherein said thermoset resin is selected from the group consisting of epoxy, phenolic's, polyimide's, and polyurethane.

6. The material according to claim 1, wherein said predetermined cross-sectional shape comprises one of a flat ribbon geometry, an elliptical geometry, and a circular geometry.

7. The material according to claim 1, wherein fiber bundles are selected from the group consisting of glass fiber, carbon fiber, aramid fiber, high modulus polyethylene fiber, quartz fiber, ceramic fiber, boron fiber, basalt fiber, steel fiber, aluminum fiber, stainless steel fiber, flax fiber, hemp fiber, jute fiber, kenaf fiber, sisal, and bamboo fiber.

8. The material according to claim 1, wherein said material has at least 15% by volume resin impregnated within said material.

* * * * *